(12) United States Patent
Tsujiguchi et al.

(10) Patent No.: US 11,628,982 B2
(45) Date of Patent: Apr. 18, 2023

(54) PLASTIC CAP AND METHOD FOR MANUFACTURING SAME

(71) Applicant: NIPPON CLOSURES CO., LTD., Tokyo (JP)

(72) Inventors: Youichi Tsujiguchi, Kanagawa (JP); Takashi Sugiyama, Kanagawa (JP)

(73) Assignee: NIPPON CLOSURES CO., LTD., Tokyo (JP)

( * ) Notice: Subject to any disclaimer, the term of this patent is extended or adjusted under 35 U.S.C. 154(b) by 458 days.

(21) Appl. No.: 16/623,687

(22) PCT Filed: Jun. 14, 2018

(86) PCT No.: PCT/JP2018/022732
§ 371 (c)(1),
(2) Date: Dec. 17, 2019

(87) PCT Pub. No.: WO2019/003940
PCT Pub. Date: Jan. 3, 2019

(65) Prior Publication Data
US 2020/0156828 A1    May 21, 2020

(30) Foreign Application Priority Data

Jun. 30, 2017  (JP) .............................. JP2017-129504

(51) Int. Cl.
*B65D 47/08* (2006.01)
*B29C 45/00* (2006.01)
(Continued)

(52) U.S. Cl.
CPC ...... *B65D 47/0838* (2013.01); *B29C 45/0053* (2013.01); *B29C 45/0081* (2013.01); *B65D 47/36* (2013.01); *B29L 2031/565* (2013.01)

(58) Field of Classification Search
CPC .... B65D 47/0838; B65D 47/36; B65D 47/08; B65D 47/141; B29C 45/0053; B29C 45/0081; B29L 2031/565
(Continued)

(56) References Cited

U.S. PATENT DOCUMENTS 3,124,281 A  *  3/1964  Stull ................... B65D 47/141
                                                      222/542
5,335,802 A  *  8/1994  Brach .................... B29C 45/26
                                                      215/253
(Continued)

FOREIGN PATENT DOCUMENTS

CN       101108672       1/2008
CN       101108673       1/2008
(Continued)

OTHER PUBLICATIONS

Japanese to English translation of JP 2015-081092.*
(Continued)

*Primary Examiner* — Patrick M. Buechner
*Assistant Examiner* — Michael J. Melaragno
(74) *Attorney, Agent, or Firm* — Smith, Gambrell & Russell, LLP (57) ABSTRACT

A plastic cap, which is a highly producible one-piece type cap when molded, but becomes a two-piece type cap excellent in sealability and openability when used, and enables a small-diameter pouring opening to be formed, is provided. The plastic cap comprises: a cap body which is composed of a top plate section and a skirt section, has a pouring nozzle formed on an outer surface of the top plate section so as to surround an opening-scheduled portion, and is fitted and fixed to a container mouth; and a top lid composed of a top face, and a circumferential wall suspending from an outer peripheral edge of the top face. The top lid has, formed (Continued)

therein, a protrusion protruding downward from an inner surface of the top face and having an engaging portion on an outer surface thereof. The cap body has an inner plug formed therein. The inner plug is composed of an annular sidewall having an outer diameter enabling the annular sidewall to intimately contact an inner surface of the pouring nozzle; and a bottom formed at a lower part of the annular sidewall. The inner plug is formed integrally with the cap body via a breakable weakened portion at a position below a seal portion of the pouring nozzle having an inner diameter enabling the seal portion to intimately contact the inner plug. On an inner surface of the annular sidewall, an engaged portion vertically engageable with the engaging portion of the protrusion is formed.

14 Claims, 7 Drawing Sheets

(51) Int. Cl.
*B65D 47/36* (2006.01)
*B29L 31/56* (2006.01)

(58) Field of Classification Search
USPC .............................................. 222/541.6, 566
See application file for complete search history.

(56) References Cited

U.S. PATENT DOCUMENTS

| | | | | |
|---|---|---|---|---|
| 5,392,938 A * | 2/1995 | Dubach | ............. | B65D 47/0814 220/254.5 |
| 5,678,735 A * | 10/1997 | Guglielmini | ......... | B65D 51/228 220/276 |
| 5,810,212 A * | 9/1998 | Santagiuliana | .... | B65D 47/0838 222/546 |
| 6,045,014 A * | 4/2000 | Marino | .............. | B65D 47/0838 222/546 |
| 6,234,334 B1 * | 5/2001 | Suarez | ............... | B65D 41/3409 222/541.6 |
| 6,550,646 B1 * | 4/2003 | Takahara | ............. | B65D 47/103 222/541.9 |
| 6,631,820 B2 * | 10/2003 | Harrold | ............. | B65D 47/0809 220/837 |
| 6,866,164 B2 * | 3/2005 | Branson | ............. | B65D 47/0885 222/153.14 |
| 7,611,025 B2 * | 11/2009 | Nusbaum | ............. | B65D 55/024 215/253 |
| 8,550,270 B2 * | 10/2013 | Jackel | ................ | B65D 47/0838 215/354 |
| 8,596,493 B2 * | 12/2013 | Vollers | ............... | B65D 47/0838 215/211 |
| 10,543,961 B2 * | 1/2020 | Kato | ........................ | C08L 23/26 |
| 10,926,923 B2 * | 2/2021 | Berroa Garcia | ....... | B65D 41/32 |
| 11,220,378 B2 * | 1/2022 | Garcia Alberola | .... | B65D 41/34 |
| 2004/0200836 A1 * | 10/2004 | Hierzer | .............. | B65D 47/0804 222/541.6 |
| 2005/0116382 A1 * | 6/2005 | Nusbaum | ........... | B65D 47/0838 264/328.1 |
| 2006/0006129 A1 * | 1/2006 | Baudin | .............. | B65D 47/0838 220/839 |
| 2006/0011667 A1 * | 1/2006 | Skillin | ............... | B65D 47/0828 222/556 |
| 2009/0308834 A1 * | 12/2009 | Isogai | ................ | B65D 47/0838 215/329 |
| 2010/0102021 A1 * | 4/2010 | Guglielmini | ....... | B65D 47/0833 215/230 |
| 2010/0102022 A1 * | 4/2010 | Kuwahara | .............. | B65D 51/18 215/235 |
| 2015/0321798 A1 * | 11/2015 | Isogai | .................. | B65D 47/106 215/253 |
| 2016/0244224 A1 * | 8/2016 | Isogai | .................. | B65D 47/123 |
| 2016/0288967 A1 * | 10/2016 | Isogai | .................... | B65D 47/36 |
| 2018/0312305 A1 * | 11/2018 | Rognard | ............ | B65D 47/0838 |
| 2020/0189809 A1 * | 6/2020 | Moskovich | .............. | B65D 1/32 |
| 2020/0339312 A1 * | 10/2020 | Krautkrämer | .......... | B65D 41/46 |
| 2020/0354118 A1 * | 11/2020 | Ferrari | ............... | B65D 47/0838 |
| 2021/0163190 A1 * | 6/2021 | Berroa Garcia | ..... | B65D 51/242 |

FOREIGN PATENT DOCUMENTS

| | | |
|---|---|---|
| CN | 101112924 | 1/2008 |
| JP | H10-338253 | 12/1998 |
| JP | 2006-176194 | 7/2006 |
| JP | 2014-162499 | 9/2014 |
| JP | 2015-67360 | 4/2015 |
| JP | 2015-81092 | 4/2015 |
| JP | 2015-209275 | 11/2015 |
| JP | 2016-30619 | 3/2016 |
| JP | 2016-210430 | 12/2016 |
| WO | 2016/092721 | 6/2016 |

OTHER PUBLICATIONS

Office Action dated Dec. 9, 2019 in Japanese Patent Application No. JP 2018/113511 and English Translation.
Chinese Office Action dated Dec. 3, 2020 for applicant's counterpart Chinese Application 201880043673.1 and English translation thereof.

* cited by examiner

PLASTIC CAP AND METHOD FOR MANUFACTURING SAME

TECHNICAL FIELD

This invention relates to a plastic cap composed of a cap body, which is fixed to a container mouth for use and has a pouring opening, and a top lid. More specifically, the invention relates to a plastic cap having both of openability and sealability and capable of forming a small-diameter pouring opening; and a manufacturing method which can mold the plastic cap with good producibility.

BACKGROUND ART

In a plastic cap composed of a cap body used as fixed to a container mouth and a top lid, it has been conventional practice, for ensuring sealability, to pull up a pull ring formed in an opening-scheduled portion of a top plate section of the cap body, when initially taking out the contents, thereby breaking a weakened portion to form an opening for pouring out the contents.

In the cap applied to a container to be filled with viscous contents, the contents are poured out by pressing the barrel of the container. To adjust the amount of pouring easily, therefore, it is desirable that the diameter of the pouring opening be small. With the cap having such a small-diameter pouring opening, however, the formation of the pull ring in the opening-scheduled portion is itself difficult. Even if the pull ring could be formed, its gripping with fingers is difficult, because of its small diameter. Hence, as stated above, the formation of an opening with ease at the start of use is impossible.

The cap without the pull ring in the opening-scheduled portion is also known. For example, Patent Document 1 indicated below proposes a hinge cap comprising a cap body provided with a pouring tube in a top wall, an outer lid coupled to the cap body via a hinge portion and provided to be openable and closable with the hinge portion as a fulcrum, and an inner lid held within the outer lid and adapted to seal an opening of the pouring tube, wherein the inner lid has a wall portion, and an inner ring formed inwardly of the wall portion and fitted into the opening of the pouring tube when the outer lid is closed; the outer lid has a ceiling wall, a skirt wall continuous with the ceiling wall, and a tubular wall provided on an inner surface of the ceiling wall inwardly of the skirt wall and formed to have a larger diameter than the diameter of the opening of the pouring tube; the tubular wall has a holding means for holding the inner lid inwardly of the tubular wall; the inner ring is formed such that at least its hinge portion side is longer than the wall portion; and the inner lid is held inwardly of the tubular wall so as to be slidable at least in a height direction, and moves together with the outer lid in accordance with an opening/closing motion of the outer lid.

PRIOR ART DOCUMENTS

Patent Documents

Patent Document 1: JP-A-2014-162499

SUMMARY OF THE INVENTION

Problems to be Solved by the Invention

With the above-described hinge cap, there is no need to form an opening by pulling up a pull ring at the time of use, and thus the contents can be taken out by unsealing in a single action manner. Since the hinge cap is a two-piece type cap having the inner lid formed separately from the cap body and the outer lid and then assembled thereto, moreover, the inner lid can move independently of the upper lid, thus imparting excellent sealability.

Since the above hinge cap is a two-piece type cap, however, it involves the addition of two steps, a step of molding the inner lid and a step of assembling the inner lid to the outer lid. Moreover, a mold for molding of the inner lid is also needed. Compared with the molding of a one-piece type cap, therefore, the hinge cap is not yet fully satisfactory in producibility and economy.

It is an object of the present invention, therefore, to provide a plastic cap which is a highly producible one-piece type cap when molded, but becomes a two-piece type cap excellent in sealability and openability when used, and enables a small-diameter pouring opening to be formed.

It is another object of the invention to provide a method for molding a plastic cap with high producibility, the method being capable of molding a plastic cap, which is excellent in sealability and openability and in which a small-diameter pouring opening can be formed.

Means for Solving the Problems

According to the present invention, there is provided a plastic cap including: a cap body which is composed of a top plate section and a skirt section, has a pouring nozzle formed on an outer surface of the top plate section so as to surround an opening-scheduled portion, and is fitted and fixed to a container mouth; and a top lid composed of a top face, and a circumferential wall suspending from an outer peripheral edge of the top face, wherein the top lid has, formed therein, a protrusion protruding downward from an inner surface of the top face and having an engaging portion on an outer surface thereof; and the cap body has an inner plug formed therein, the inner plug is composed of an annular sidewall having an outer diameter enabling the annular sidewall to intimately contact an inner surface of the pouring nozzle, and a bottom section formed at a lower part of the annular sidewall; the inner plug is formed integrally with the cap body via a breakable weakened section at a position below a seal portion of the pouring nozzle having an inner diameter enabling the seal portion to intimately contact the inner plug, and an engaged portion vertically engageable with the engaging portion of the protrusion is formed on an inner surface of the annular sidewall.

In the plastic cap of the present invention, the following features are preferred:

1. The inner plug is formed, via the breakable weakened portion, starting at the edge of the opening-scheduled portion of the top plate section;
2. With the top lid being fixed to the cap body, the breakable weakened portion is broken, the engaged portion of the inner plug released from the cap body climbs over the engaging portion of the protrusion, whereupon the engaged portion and the engaging portion become engageable with each other, and the outer surface of the annular sidewall and the inner surface of the pouring nozzle make intimate contact;
3. A guide portion extending upward is formed at the bottom of the inner plug, and a recess capable of accommodating the guide portion is formed in the middle of the protrusion;
4. In a closed state of the top lid fixed to the cap body, the engaging portion of the protrusion and the engaged portion of the inner plug have a gap therebetween in an axial direction;

5. The outer diameter of the guide portion is smaller than the inner diameter of the recess of the protrusion, and the axial length of the guide portion is smaller than the depth of the recess of the protrusion;

6. With the top lid being fixed to the cap body, the upper end of the guide portion is located axially upwardly of the engaging portion of the protrusion, and is located axially downwardly of the engaged portion of the inner plug; and 7. The top lid is hingedly coupled to the cap body.

According to the present invention, there is also provided a method for manufacturing the above-described plastic cap, including: molding the cap body and the top lid, and then with the top lid being fixed to the cap body, pressing the bottom of the inner plug from below to break the breakable weakened portion, render the engaging portion of the protrusion and the engaged portion of the inner plug engageable with each other, and bring the outer surface of the annular sidewall and the inner surface of the pouring nozzle into intimate contact.

In the method for manufacturing the plastic cap of the present invention, it is preferred that the cap body and the top lid be hingedly coupled together, and that after the cap body and the top lid are molded in an opened state, the top lid be fixed to the cap body.

Effects of the Invention

In the plastic cap of the present invention, the inner plug which has so far been formed as a component separate from the cap body and the top lid can be molded integrally with the cap body, thus affording excellent producibility.

Moreover, the pouring opening of a diameter small enough to make the formation of a pull ring impossible can be formed. Thus, the contents can be poured out only in an amount corresponding to the pressing of the container, and the container can be easily squeezed back, thus effectively preventing liquid dripping, for example. Herein, the small-diameter pouring opening means a pouring opening (opening-scheduled portion) of such a diameter that no pull ring can be formed in the opening-scheduled portion, and specifically refers to, but not limited to, a pouring opening (opening-scheduled portion) having a diameter of the order of 3 to 18 mm. The cap having such a small-diameter pouring opening can be used suitably for a container of such a type as to squeeze out the contents, such as a squeeze bottle.

The inner plug molded integrally with the cap body is formed integrally with the cap body via the breakable weakened portion at a position below the seal portion of the pouring nozzle having an inner diameter enabling the seal portion to intimately contact the inner plug. The edge, on the side of the cap body, of the weakened portion that has been broken is located on the axially lower side of the pouring nozzle. Thus, the pourability of the contents is not impaired. Nor is the sealing point impaired. Consequently, excellent sealability is ensured.

Furthermore, the inner plug has an outer diameter enabling the inner plug to intimately contact the inner surface of the pouring nozzle. In the closed state, therefore, the inner plug contacts the seal portion of the pouring nozzle firmly and intimately, and can thus ensure liquid-tightness. On the other hand, the engaging portion of the protrusion of the top lid and the engaged portion of the inner plug are formed such that a clearance is present vertically therebetween. As a result, the inner plug has mobility with respect to the top lid. Since the inner plug follows the movement of the top lid with delay, therefore, opening force can be dispersed, and the initial opening force exerted on the top lid is not increased. Even if the top lid undergoes drop impact, impairment of sealability is effectively prevented, because the inner plug does not move together with the top lid.

Besides, the inner plug formed integrally with the cap body via the weakened portion has its bottom pressed from below the cap body. Because of this feature, the inner plug is released from the cap body and, at the same time, the engaging portion of the protrusion formed in the top lid and the engaged portion of the inner plug become engageable. Hence, the cap is easy to assemble, and excellent in producibility and economy.

MODE FOR CARRYING OUT THE INVENTION

The plastic cap of the present invention will now be described by reference to the accompanying drawings.

An example of the plastic cap of the present invention shown in FIGS. 1 to 7 is a hinge cap comprising a cap body 1, a top lid 20 coupled to the cap body 1 by a hinge 11, and an inner plug 30 which is formed to be releasable from the cap body 1 and which, after release from the cap body, can be integrated with the top lid, the hinge cap being constituted by integral molding of these components.

The cap body 1 to be fitted and fixed to a container mouth (not shown) comprises a top plate section 2, and a skirt section 3 suspending from the peripheral edge of the top plate section 2. The skirt section 3 is divided into an inner tubular wall 3*a* and an outer tubular wall 3*b* via a groove 4 extending from above to below, the outer tubular wall 3b being formed as if to hoop the inner tubular wall 3a. In a lower end part of the groove 4, a partial region corresponding to a hinge portion of the top lid 20 (to be described later) in a circumferential direction is penetrated by a slit 12. In a circumferential region of the lower end part other than the slit 12, the inner tubular wall 3a and the outer tubular wall 3b are coupled together on a lower side via a junction 13. The junction 13 is formed from a breaking junction breakable in the circumferential direction, and a non-breaking junction having a wall relatively thicker than the wall of the breaking junction. A lower part of the inner surface of the inner tubular wall 3a has, formed thereon, an inwardly protruding annular convex 5 which engages an engaging depression of a container mouth 60 (to be described later) to fix the cap body 1 to the container mouth. The outer tubular wall 3b has, near the hinge portion, a breakable axial score 6 formed to extend from above to below. When the contents are used up and the cap is to be discarded, the top lid 20 is pulled downward at the hinge portion to break the score 6. Then, of the junction 13, the breaking junction is broken in the circumferential direction, whereas the non-breaking junction is not broken. Thus, the top lid 20 and the cap body 1, while being coupled together, can be detached easily from the container mouth, and so have sorted disposability.

At the end, on the outer surface side, of the top plate section 2, an annular projection 7 is formed for engaging the top lid 20 to fix the top lid 20, and a small-diameter pouring nozzle 8 is formed inwardly of the annular projection 7 on the pouring direction side (on the side opposite to the hinge portion). On the inner surface of the top plate section 2, on the other hand, an inner ring 9 is formed for intimately contacting the inner surface of the container mouth 60.

The inner plug indicated entirely at 30 is formed integrally with the cap body 1 via a breakable score (weakened portion) 10 at the boundary between the pouring nozzle 8 and the inner surface of the top plate section 2 (i.e., at the edge of an opening-scheduled portion) so as to close the opening-scheduled portion which is defined by the boundary between the pouring nozzle 8 and the inner surface of the top plate section 2.

The inner plug 30 is formed with an annular sidewall 31 extending downwardly from the breakable score 10, and a bottom 32 so as to close the axially lower end of the annular sidewall 31. As stated earlier, the outer diameter of the annular sidewall 31 is such a dimension that the annular sidewall 31 makes intimate contact with the inner surface of the pouring nozzle 8, and the axial length of the entire inner plug is about 75% of the length of the pouring nozzle. In the concrete example shown in the drawing, the bottom 32 has an inclination formed so that its diameter decreases axially downwardly. Hence, after the inner plug 30 is released from the cap body and integrated with the top lid, its fitting into the pouring nozzle 8 is easy.

At an upper part of the inner surface of the annular sidewall 31 of the inner plug 30, is formed an annular top lid-engaging portion (engaged portion) 33 to be engaged with an inner plug-engaging portion (engaging portion; to be described later) formed in the top lid. In this embodiment, a rod-shaped guide portion 34 (may hereinafter be referred to as "guide rod") is formed which extends axially upwardly from the middle of the bottom 32 of the inner plug 30.

The top lid indicated entirely at 20 is formed integrally with the cap body 1 via the hinge 11 at a position, on the side opposite to the pouring direction, of the upper end of the outer tubular wall 3b of the cap body 1.

Figure 3:
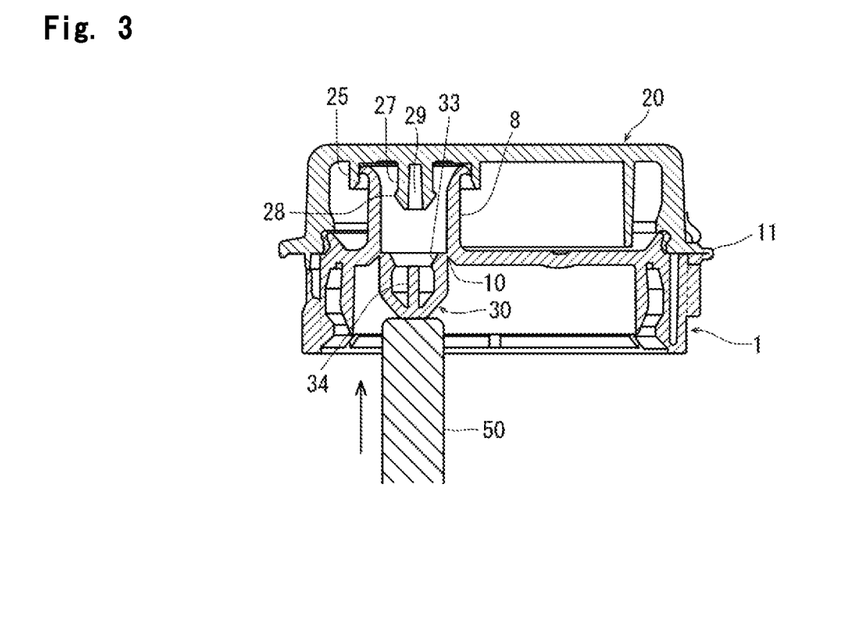
FIG. 3 is a view for illustrating a step of setting an inner plug in the top lid.

The top lid 20 comprises a top face 21, and a circumferential wall 22 suspending from the outer peripheral edge of the top face 21. In a lower part of the inner surface of the circumferential wall 22, there is formed an annular ridge 23 which engages the aforementioned annular projection 7 of the cap body 1 to fix the top lid 20 to the cap body 1 in a lid-closed state. At a position at the lower end of the circumferential wall 22 on the side opposite to the hinge 11, a knob 24 is formed for bringing the top lid 20 upward. Herein, the term "axially upward or downward" in connection with the top lid 20 refers to upward or downward in a state where the top face 21 is located above (a state as shown in FIG. 3).

On the top face 21 is also formed a circumferential projection 25 which, in the lid-closed state, is located at a position corresponding to the pouring nozzle 8 of the cap body 1, extends downward, and has an inner diameter of nearly the same dimension as the outer diameter of the leading end of the pouring nozzle 8. The positioning of the pouring nozzle 8 inside the circumferential projection 25 can effectively prevent the top lid 20 from being displaced from the cap body 1, for example, if the cap undergoes impact from outside. With the exception of the site where the circumferential projection 25 is formed, an arcuate projection 26 is formed to extend downward from the inner surface of the top face 21. The arcuate projection 26 can prevent the collapse of the top lid due to impact on the top lid 20 from above in the lid-closed state.

Inwardly of the circumferential projection 25 in the top lid, a protrusion 27 which protrudes downward is formed for fixing the inner plug 30 released from the cap body 1. On the outer peripheral surface of the leading end of the protrusion 27, an outwardly protruding inner plug-engaging portion (engaging portion) 28 is formed in such a manner as to be vertically engageable with the aforementioned top lid-engaging portion (engaged portion) 33 of the inner plug 30.

In the protrusion 27, a recess 29 is formed which extends from the leading end toward the base (top lid site) of the protrusion 27. The insertion of the aforementioned guide rod 34 of the inner plug 30 into the recess 29 can prevent the tilting of the inner plug 30 released from the cap body 1, and prevent the release of the inner plug 30 from the top lid 20 due to the protrusion 27 falling down inwardly when the top lid is opened. The leading end 34a of the guide rod 34 is located axially upwardly of the engaging portion 28 of the protrusion 27, and located axially downwardly of the top lid-engaging portion (engaged portion) 33 of the inner plug 30, with the inner plug being integrated with the top lid (see FIG. 5). Because of this configuration, when the inner plug is set in the top lid, the engaging portion 28 of the protrusion 27 can escape diametrically inwardly, and can smoothly climb over the top lid-engaging portion (engaged portion) 33 of the inner plug 30.

The recess 29 has an inner diameter greater than the outer diameter of the guide rod 34, and has a depth greater than the length of the guide rod 34. Owing to this configuration, the inner plug 30 has a movable region with respect to the top lid 20, and can thus enhance sealing performance without increasing the aforementioned initial opening force exerted on the top lid.

Figure 1:
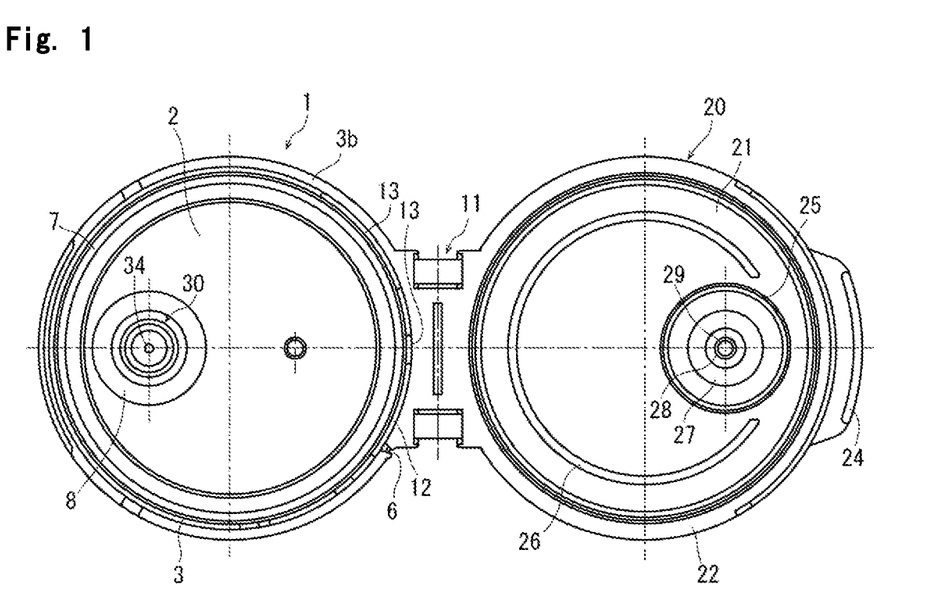
FIG. 1 is a top view of a hinge cap, an example of a plastic cap according to the present invention, with a top lid being open.
Figure 2:
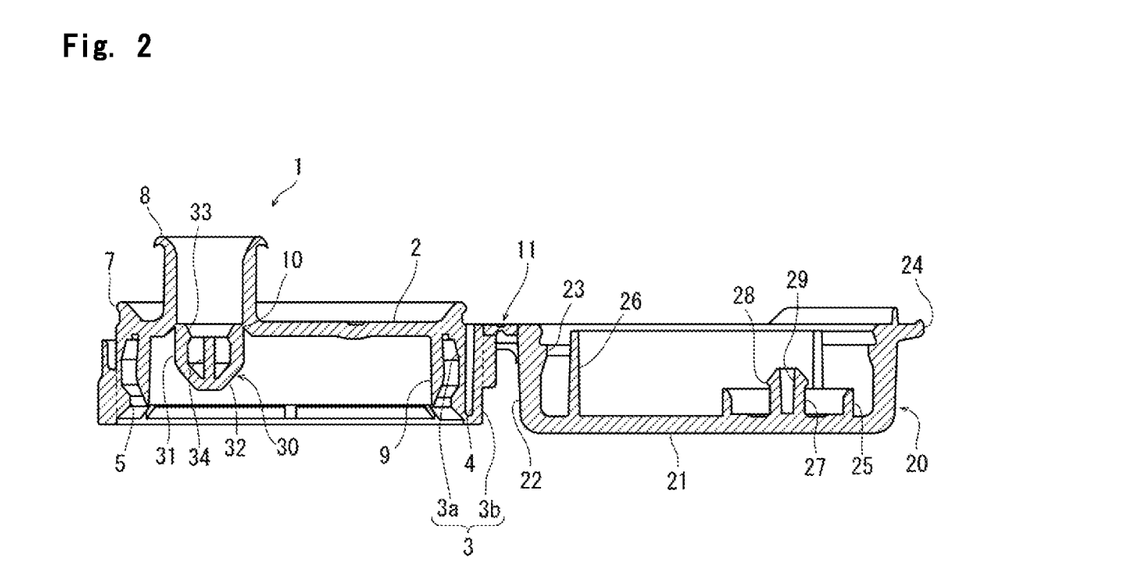
FIG. 2 is a side sectional view of the hinge cap shown in FIG. 1, with the top lid being open.

In the plastic cap of the present invention, after it is molded in the state shown in FIGS. 1 and 2, the top lid 20 is applied onto the cap body 1 to bring the annular projection 7 of the cap body 1 and the annular ridge 23 of the top lid 20 into engagement and fixation, as shown in FIG. 3. Then, the bottom 32 of the inner plug 30 is pushed up from below the cap body 1 with the use of a pressing jig 50. When the score 10 is broken under this action, the inner plug 30 is simultaneously pushed into the pouring nozzle 8, the guide rod 34 of the inner plug 30 is inserted into the recess 29 of the protrusion 27, and the top lid-engaging portion (engaged portion) 33 climbs over the inner plug-engaging portion (engaging portion) 28 of the protrusion 27 of the top lid 20. As a result, it becomes possible to fix the inner plug 30 to the upper side of the interior of the pouring nozzle 8, at a mutually engageable position and a position above the broken score 10. Therefore, the pourability of the contents of the pouring nozzle 8 can be maintained, without the influence of burrs resulting from the broken score 10. Nor is the sealability of a seal portion (seal point) between the pouring nozzle 8 and the inner plug 30 (to be described later) impaired.

Figure 4:
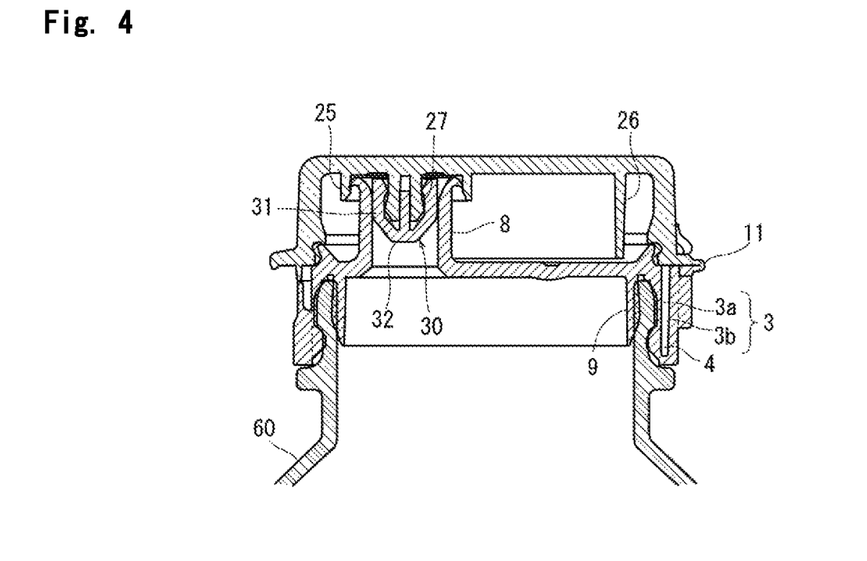
FIG. 4 is a side sectional view of the hinge cap shown in FIG. 1, with the top lid being closed after engagement of the inner plug with a protrusion of the top lid.
Figure 5:
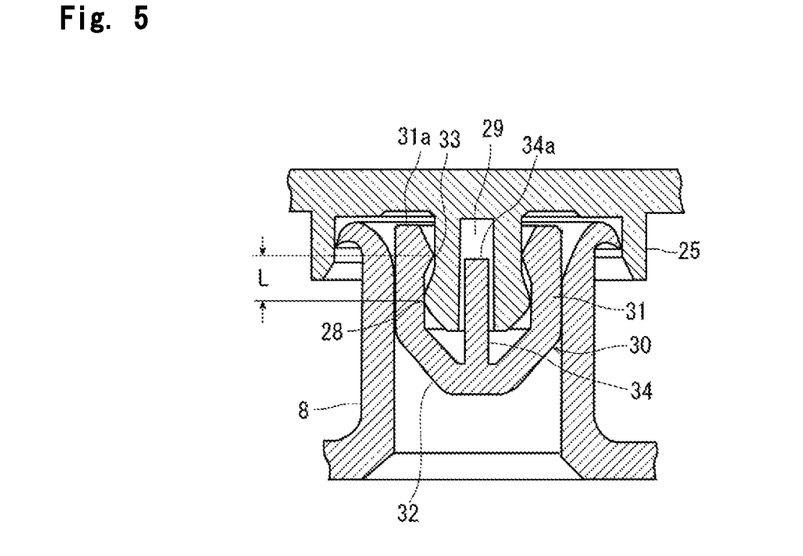
FIG. 5 is an enlarged sectional view of the site of engagement between the protrusion of the top lid and the inner plug in FIG. 4.
Figure 6:
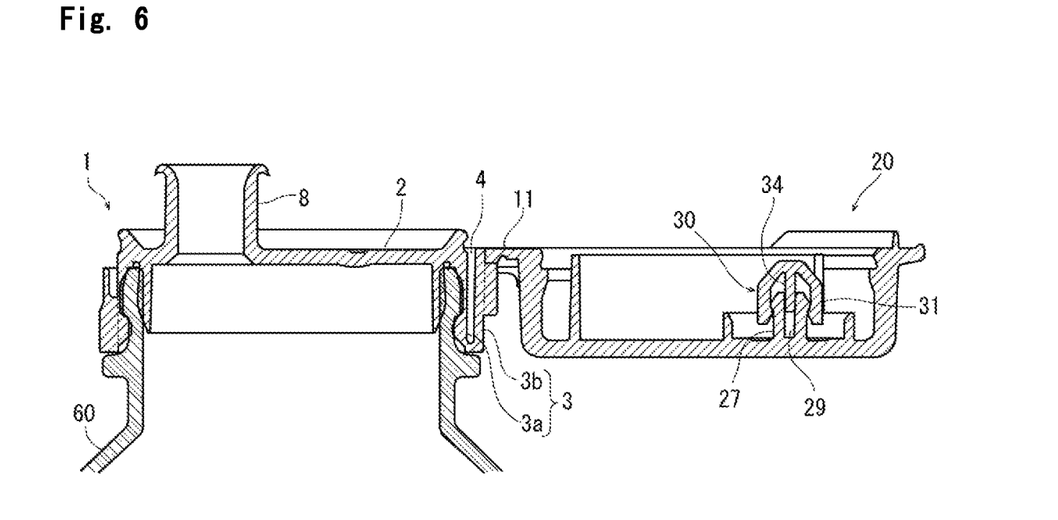
FIG. 6 is a side sectional view of the hinge cap shown in FIG. 4, with the top lid being open.
Figure 7:
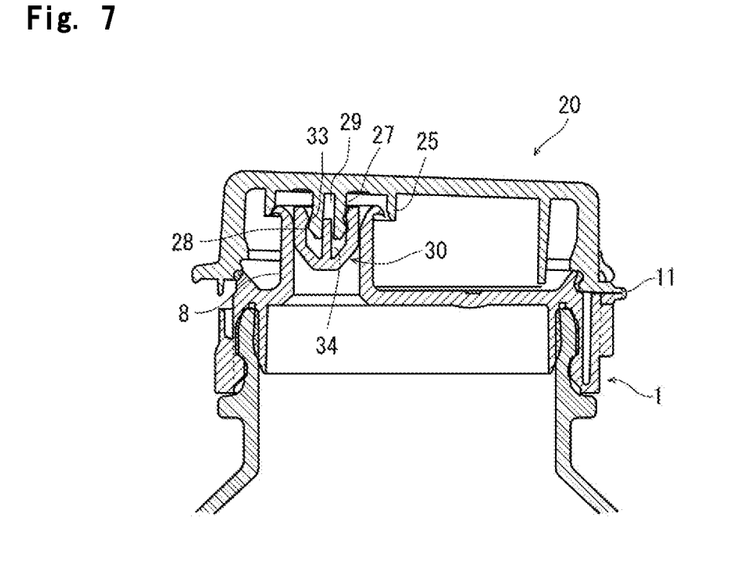
FIG. 7 is a side sectional view of the hinge cap shown in FIG. 4, showing a state in which the top lid begins to be opened.

FIG. 4 is a drawing showing a side sectional view of a state in which the hinge cap having the inner plug 30 set in the top lid 20 has been applied to the container mouth 60. FIG. 5 is a view showing, on an enlarged scale, the site of engagement between the pouring nozzle 8 and the inner plug 30 in this state. FIG. 6 is a side sectional view showing the top lid in an opened state.

As clear from FIGS. 4 and 5, the outer surface of the annular sidewall 31 of the inner plug 30 is in intimate contact with the inner surface of the pouring nozzle 8 to ensure a liquid-tight state. Moreover, the guide rod 34 of the inner plug 30 is inserted into the recess 29 provided in the protrusion 27. Even in a state where the inner plug 30 has been detached from the pouring nozzle 8 (see FIG. 6), therefore, the annular sidewall 31 of the inner plug 30 is effectively prevented from tilting, and the inner plug does not fall off.

As is clear from FIG. 5, the inner plug-engaging portion (engaging portion) 28 of the protrusion 27 and the top lid-engaging portion (engaged portion) 33 of the inner plug 30 engage each other in the axial direction when the top lid is opened. However, their engaging relationship is such that a clearance equivalent to an axial distance L is present between them. That is, when the top lid 20 is in a completely closed state, the inner plug-engaging portion (engaging portion) 28 of the protrusion 27 and the top lid-engaging portion (engaged portion) 33 of the inner plug 30 are spaced by the axial distance L, as shown in FIG. 5. As stated earlier, moreover, the guide rod 34 is small in diameter and short as compared with the dimensions of the recess 29. Even when the top lid 20 is slightly pulled up for opening and the protrusion 27 is somewhat inclined, therefore, the position of the inner plug 30 does not change, and only the protrusion 27 ascends together with the top lid 20, while the inner plug 30 does not move from the pouring nozzle 8 (see FIG. 7). Consequently, in the initial stage of opening of the top lid 20 (concretely, when the engagement between the annular projection 7 of the cap body 1 and the annular ridge 23 of the top lid 20 is to be released), the inner plug 30 still remains motionless, but keeps intimate contact with the seal portion of the pouring nozzle 8. Thus, the initial opening force exerted on the top lid 20 is not increased, so that the openability of the lid is not impaired. Additionally, in the initial opening state, the sealability of the cap is not eliminated.

The top lid 20 is further pulled upward, whereupon the protrusion 27 is raised by the distance L, and the inner plug-engaging portion (engaging portion) 28 of the protrusion 27 engages the top lid-engaging portion (engaged portion) 33 of the inner plug 30. As a result, the inner plug 30 is also pulled up together with the top lid 20 and, as shown in FIG. 6, the inner plug 30 is integrated with the top lid 20 and removed from the pouring nozzle 8. On this occasion, the guide rod 34 of the inner plug 30 has been inserted into the recess 29 provided in the protrusion 27. Thus, the protrusion 27 is effectively prevented from falling down inward. That is, even though the outer surface of the annular sidewall 31 of the inner plug 30 and the inner surface of the pouring nozzle 8 are in relatively highly intimate contact to enhance sealability, the inner plug 30 can be prevented from slipping off the top lid 20.

The plastic cap of the present invention described above is an example of a hinge cap having a small-diameter pouring opening formed therein. However, the plastic cap of the present invention is not limited to a cap having a small-diameter pouring opening which makes the formation of a pull ring difficult, but may be a cap formed with a large-diameter pouring opening. According to the present invention, even such a cap formed with a large-diameter pouring opening obviates the act of forming the pouring opening by pulling up a pull ring after opening the top lid, and ensures excellent openability. As in the aforementioned hinge cap having a small-diameter pouring opening, the inner plug can be molded integrally with the cap body, and affords excellent producibility. Also, the inner plug has mobility with respect to the top lid, affording excellent openability and sealability.

FIGS. 8 to 13 show an example of a hinge cap having a large-diameter pouring opening formed therein.

The hinge cap shown in FIGS. 8 to 13 has the same basic configuration as that of the foregoing hinge cap having a small-diameter pouring opening, except that the dimension of the diameter of a pouring nozzle, the shape of an inner plug, and the shape of a protrusion of a top lid are different.

That is, the hinge cap shown in FIGS. 8 to 13 also comprises a cap body 1, a top lid 20 hingedly coupled to the cap body 1, and an inner plug 40 formed to be releasable from the cap body 1 and becoming capable of being integrated with the top lid after release from the cap body, and is constituted by the integral molding of these components.

In this embodiment, the inner diameter of a pouring nozzle 8 formed in the cap body 1 is slightly smaller than the inner diameter of an inner ring 9. In this embodiment, therefore, the contents can be poured out in a large amount.

The inner plug indicated entirely at 40 is formed integrally with the cap body 1 via a breakable score (weakened portion) 10 at the boundary between the pouring nozzle 8 and the inner surface of a top plate section 2 (i.e., at the edge of an opening-scheduled portion) so as to close the opening-scheduled portion which is defined by the boundary between the pouring nozzle 8 and the inner surface of the top plate section 2, as in the embodiment shown in FIGS. 1 to 7.

The inner plug 40 has, formed therein, an annular sidewall 41 extending downwardly from the breakable score 10, and a bottom 42 so as to close the axially lower end of the annular sidewall 41. As in the embodiment shown in FIG. 1, the outer diameter of the annular sidewall 41 is such a dimension that the annular sidewall makes intimate contact with the inner surface of the pouring nozzle 8. In this embodiment as well, the bottom 42 has an inclination formed so that its diameter decreases axially downwardly. Thus, after the inner plug 40 is released from the cap body and integrated with the top lid, its fitting into the pouring nozzle 8 is easy. Thanks to the inclination of the bottom 42, moreover, when the top lid is to be closed, the movable inner plug can be easily guided into the pouring nozzle 8.

At an upper part of the inner surface of the annular sidewall 41 of the inner plug 40, is formed an annular top lid-engaging portion (engaged portion) 43 to be engaged with an inner plug-engaging portion (engaging portion; to be described later) formed in the top lid.

At the bottom 42 of the inner plug 40, a guide portion 44 is formed as in the aforementioned embodiment shown in FIG. 1. The guide portion shown in FIG. 1 is the rod-shaped guide portion, whereas the guide portion 44 in this embodiment is composed of an annular wall 45, which is nearly concentric with the annular sidewall 41 and extends axially upwardly from the bottom 42, and an upper wall 46 closing the axially upper end of the annular wall 45.

The top lid indicated entirely at 20 is formed integrally with the cap body 1 via a hinge 11 at a position, on the side opposite to the pouring direction, of the upper end of an outer tubular wall 3b of the cap body 1, as in the embodiment shown in FIGS. 1 to 7.

In the top lid 20 shown in FIG. 1, the arcuate projection 26 is formed. In this embodiment, however, the large-diameter pouring nozzle 8 is present over the entire circumference near the peripheral edge of the top plate section. Thus, the collapse of the top lid in the lid-closed state can be prevented by the pouring nozzle 8, so that a component corresponding to the arcuate projection 26 is not formed.

Inwardly of a circumferential projection 25 in the top lid, a protrusion 27 is formed for fixing the inner plug 40 released from the cap body 1. The protrusion 27 is formed to have a large outer diameter, as compared with the embodiment shown in FIG. 1, in conformity with the outer diameter of the inner plug 40. In this embodiment as well, on the outer peripheral surface of the leading end of the protrusion 27, is formed an outwardly protruding inner plug-engaging portion (engaging portion) 28 which is axially (vertically) engageable with a top lid-engaging portion (engaged portion) 43 of the inner plug 40.

In the protrusion 27, a recess 29 which coincides with the shape of the guide portion 44 of the inner plug 40 (outer diameter of the annular wall 45) is formed. The insertion of the guide portion 44 into the recess 29 can prevent the tilting of the inner plug 40 which has been released, and prevent the release of the inner plug 40 due to the protrusion 27 falling down inwardly when the top lid is opened. The recess 29 has an inner diameter greater than the outer diameter of the guide portion 44, and has a depth smaller than the length of the annular wall 45 of the guide portion 44. Hence, the inner plug 40 has a movable region in the axial direction with respect to the top lid 20, and can enhance sealing performance without increasing the initial opening force exerted on the top lid.

Figure 8:
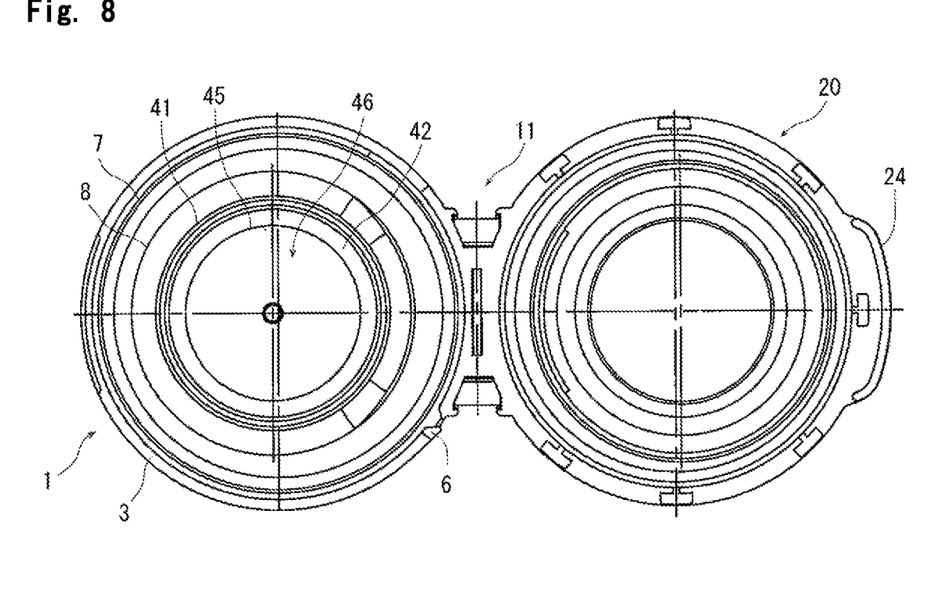
FIG. 8 is a view showing another example of a plastic cap according to the present invention, a top view showing a top lid open.
Figure 9:
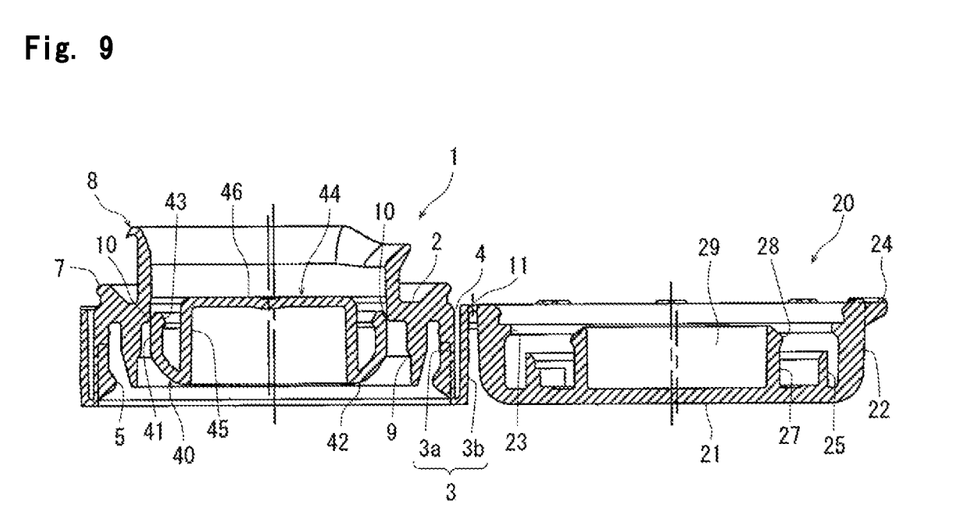
FIG. 9 is a side sectional view of the hinge cap shown in FIG. 8, with its top lid being open.
Figure 10:
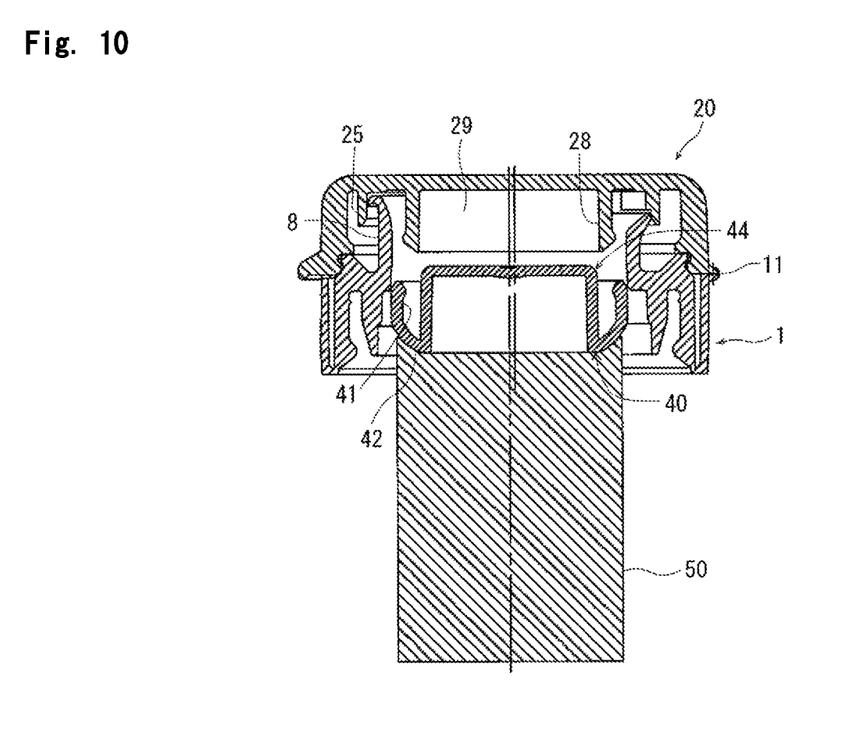
FIG. 10 is a view for illustrating a step of setting an inner plug in the top lid in the hinge cap shown in FIG. 8.

In the hinge cap of this embodiment as well, after it is molded in the state shown in FIGS. 8 and 9, the top lid 20 is applied onto the cap body 1 to bring an annular projection 7 of the cap body 1 and an annular ridge 23 of the top lid 20 into engagement and fixation, as shown in FIG. 10. Then, the bottom 42 of the inner plug 40 is pushed up from below the cap body 1 with the use of a pressing jig 50. When the score 10 is broken under this action, the inner plug 40 is simultaneously pushed into the pouring nozzle 8, the guide portion 44 of the inner plug 40 is inserted into the recess 29 of the protrusion 27, and the top lid-engaging portion (engaged portion) 43 climbs over the inner plug-engaging portion (engaging portion) 28 of the protrusion 27 of the top lid 20. As a result, it becomes possible to fix the inner plug 40 to the upper side of the interior of the pouring nozzle 8, at a mutually engageable position and a position above the broken score 10.

Figure 11:
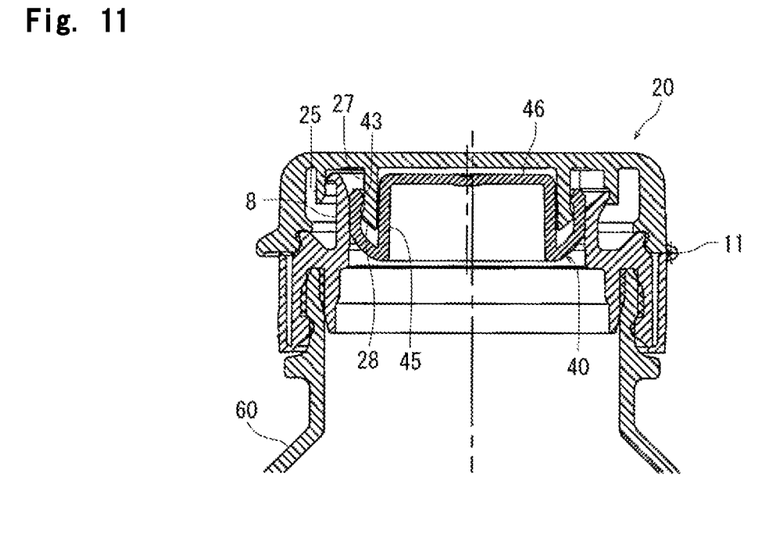
FIG. 11 is a side sectional view showing a state in which the top lid is closed after engagement of the inner plug with a protrusion of the top lid, in the hinge cap shown in FIG. 8.
Figure 12:
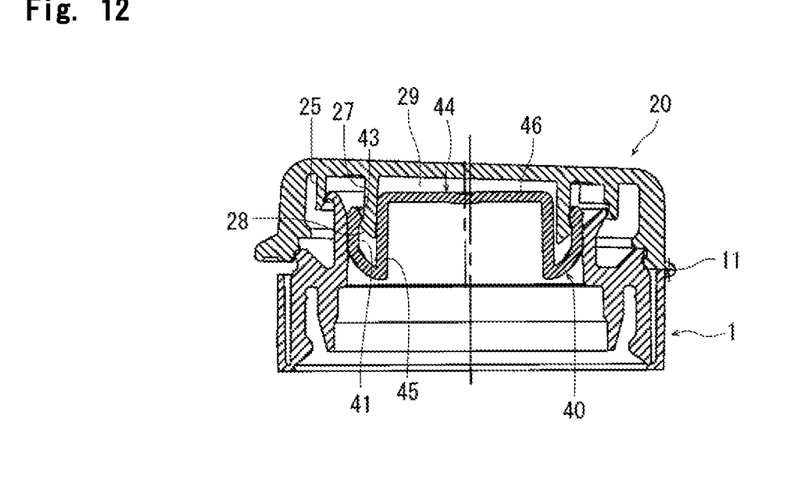
FIG. 12 is a side sectional view showing a state in which the top lid begins to be opened, starting from the state shown in FIG. 11.
Figure 13:
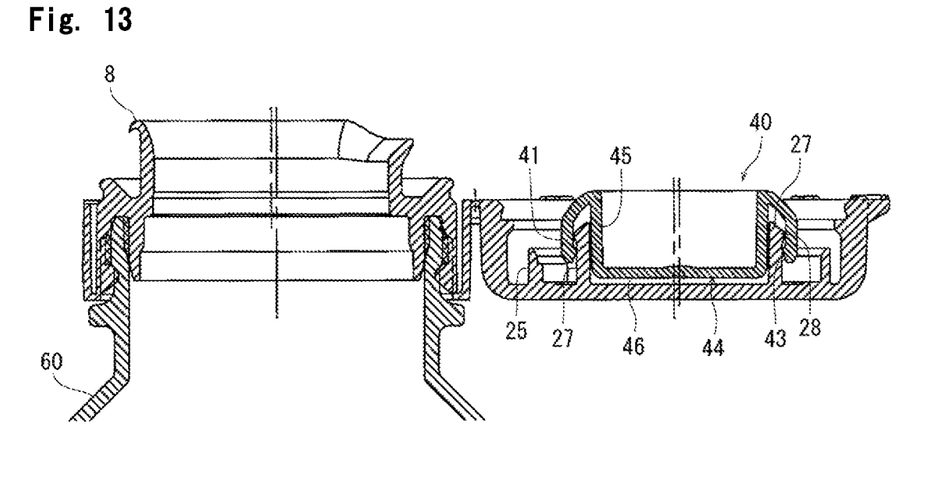
FIG. 13 is a side sectional view showing a state in which the top lid is opened, beginning from the state shown in FIG. 12.

FIG. 11 is a drawing showing a side sectional view of a state in which the hinge cap having the inner plug 40 set in the top lid 20 has been applied to a container mouth 60. FIG. 12 is a view showing a state in which the top lid 20 has been slightly pulled up for opening, starting from the state shown in FIG. 11. Even if the protrusion 27 is somewhat inclined, the position of the inner plug 40 does not change. In the initial stage of opening of the top lid 20, the inner plug 40 still remains motionless, but keeps intimate contact with the seal portion of the pouring nozzle 8. Thus, the initial opening force exerted on the top lid 20 is not increased, so that the openability of the lid is not impaired. Additionally, in the initial opening state, the sealability of the cap is not eliminated. Furthermore, FIG. 13 is a view showing a state in which the inner plug 40 has been completely detached from the pouring nozzle 8, and has become integrated with the top lid 20. Even in this state, the inner plug 40 has the top lid-engaging portion (engaged portion) 43 in axial engagement with the inner plug-engaging portion (engaging portion) 28, and also has the guide portion 44 diametrically fixed by the recess 29. Thus, the annular sidewall 41 is effectively prevented from tilting, and the inner plug does not slip off.

The plastic cap of the present invention is not limited to the concrete examples illustrated in the foregoing drawings, but is capable of various changes and modifications.

That is, the plastic caps shown in the drawings each have the cap body and the top lid coupled together by a hinge, and have the cap body, the top lid, and the inner plug integrally molded. However, any of the plastic caps may be one in which the top lid is molded separately from the cap body, and fixed to the cap body by threaded engagement or the like. Even in this case, the inner plug can be molded integrally with the cap body. Compared with the conventional cap, therefore, the cap of the present invention is easy to mold, and is excellent in producibility and economy.

Moreover, the cap body shown in the drawings is a plugging cap of a type fitted and fixed to a container mouth by engaging portions. Thus, it has been of a double structure having a score-equipped outer tubular wall outside a skirt section for sorted disposal. Needless to say, however, the cap body may be a cap body having a thread portion formed in a skirt section so as to be fixed to a container mouth by threaded engagement.

Furthermore, the plastic cap of the present invention can exhibit excellent moldability, sealability, etc. even in the case of a cap having a small-diameter pouring opening which makes the formation of a pull ring impossible.

Thus, it can be suitably used, particularly, as a cap formed with a small-diameter pouring opening of a dimension in the range of 3 to 18 mm. As shown in FIGS. 8 to 13, however, it can also be suitably used as a cap formed with a large-diameter pouring opening.

Besides, the inner plug shown in FIGS. 1 to 7 has an axial length which is about 75% of that of the pouring nozzle. The inner plug shown in FIGS. 8 to 13 can also be changed, as appropriate, depending on the size (diameter and length) of the pouring nozzle, the bottom shape of the inner plug, and so forth.

In addition, the length of the axial clearance L between the top lid-engaging portion of the inner plug and the inner plug-engaging portion of the protrusion cannot be unconditionally determined by the diameter of the cap or the size of the pouring opening, but is preferably a length which is 20 to 80% of the axial length of the inner plug.

Additionally, the shape of the bottom of the inner plug is not limited to the concrete examples shown in the drawings, but can also be subject to various changes. From the viewpoint of the ease of fitting of the inner plug into the pouring nozzle, however, it is preferred that the shape of the bottom be a truncated conical shape having an inclination formed at the boundary between the annular sidewall and the bottom, or be a hemispherical shape.

The breakable weakened portion, the site of coupling between the inner plug and the cap body, may be formed below the seal portion in the inner surface of the pouring nozzle, which has an inner diameter enabling intimate contact with the outer surface of the annular sidewall of the inner plug. In the concrete examples illustrated in the drawings, the lower end of the pouring nozzle agrees with the top plate section, and the inner plug is integrally formed at the edge of the opening-scheduled portion of the cap body via the breakable weakened portion, but this embodiment is not limitative. For example, if the lower end of the pouring nozzle is located downwardly of the top plate section, the inner plug may be integrally formed at the lower end of the pouring nozzle via the breakable weakened portion. Alternatively, in a case where the inner surface of the pouring nozzle is partially contracted, and this contracted part serves as the seal portion, then the inner plug may be integrally formed, via the breakable weakened portion, on the inner surface of the pouring nozzle below this seal portion.

The plastic cap of the present invention, if it is a hinge cap, can be integrally molded by injection molding or the like, with the top lid being open. Then, the top lid is folded and fixed to the cap body. Then, the site of the inner plug is pushed upward from below by a pressing jig or the like, whereby the breakable weakened portion formed at the boundary between the cap body and the upper end of the inner plug can be torn, and the inner plug can be fixed to the top lid.

The cap of the present invention can be molded by a publicly known method, such as injection molding or compression molding, using a resin conventionally used for the molding of a plastic cap, such as an olefin resin, for example, polyethylene or polypropylene.

INDUSTRIAL APPLICABILITY

The plastic cap of the present invention can have a cap body and an inner plug formed in one piece, is excellent in producibility and sealability, and can be suitably used as a cap for a container holding a liquid as its contents. Particularly, it can be suitably molded as a plastic cap having a small-diameter pouring opening making the formation of a pull ring difficult, facilitates the adjustment of the amount of pouring of the contents, and can prevent liquid dripping due to squeezing-back. Thus, the plastic cap can be used suitably as a cap for a squeeze bottle.

EXPLANATIONS OF LETTERS OR NUMERALS

1 Cap body, 2 Top plate section, 3 Skirt section, 3a Inner sidewall, 3b Outer tubular wall, 4 Groove, 5 Annular convex, 6 Breakable score, 7 Annular projection, Pouring nozzle, 9 Inner ring, 10 Breakable score (Weakened portion), 11 Hinge, 12 Slit, 13 Junction, 20 Top lid, 21 Top face, 22 Circumferential wall, 23 Annular ridge, 24 Knob, 25 Circumferential projection, 26 Arcuate projection, 27 Protrusion, 28 Inner plug-engaging portion (Engaging portion), 29 Recess, 30 Inner plug, 31 Annular sidewall, 32 Bottom, 33 Top lid-engaging portion (Engaged portion), 34 Guide portion (Guide rod), 40 Inner plug, 41 Annular sidewall, 42 Bottom, 43 Top lid-engaging portion (Engaged portion), 44 Guide portion, 45 Annular wall, 46 Upper wall, 50 Pressing jig, 60 Container mouth.

The invention claimed is:

1. A plastic cap including:
a cap body which is composed of a top plate section and a skirt section, has a pouring nozzle formed on an outer surface of the top plate section so as to surround an opening-scheduled portion, and can be fitted and fixed to a container mouth; and
a top lid composed of a top face, and a circumferential wall suspending from an outer peripheral edge of the top face, wherein
the top lid has, formed therein, a protrusion protruding downward from an inner surface of the top face and having an engaging portion on an outer surface thereof,
the cap body has an inner plug formed therein,
the inner plug is composed of an annular sidewall having an outer diameter enabling the annular sidewall to intimately contact an inner surface of the pouring nozzle, and a bottom formed at a lower part of the annular sidewall,
the inner plug is formed integrally with the cap body via a breakable weakened portion at a position below a seal portion of the pouring nozzle having an inner diameter enabling the seal portion to intimately contact the inner plug,
an engaged portion vertically engageable with the engaging portion of the protrusion is formed on an inner surface of the annular sidewall,
a guide portion extending upward is formed at the bottom of the inner plug, and
a recess capable of accommodating the guide portion is formed in a middle of the protrusion.

2. The plastic cap according to claim 1, wherein
the inner plug is formed, via the breakable weakened portion, starting at an edge of the opening-scheduled portion of the top plate section.

3. The plastic cap according to claim 1, wherein, with the top lid being fixed to the cap body,
the breakable weakened portion is broken,
the engaged portion of the inner plug released from the cap body climbs over the engaging portion of the protrusion, whereupon the engaged portion and the engaging portion become engageable with each other, and
an outer surface of the annular sidewall and the inner surface of the pouring nozzle make intimate contact.

4. The plastic cap according to claim 3, wherein
in a closed state of the top lid fixed to the cap body, the engaging portion of the protrusion and the engaged portion of the inner plug have a clearance therebetween in an axial direction.

5. The plastic cap according to claim 1, wherein
an outer diameter of the guide portion is smaller than an inner diameter of the recess of the protrusion, and
an axial length of the guide portion is smaller than a depth of the recess of the protrusion.

6. The plastic cap according to claim 5, wherein
with the top lid being fixed to the cap body, an upper end of the guide portion is located axially upwardly of the engaging portion of the protrusion, and is located axially downwardly of the engaged portion of the inner plug.

7. A plastic cap including:
a cap body which is composed of a top plate section and a skirt section, has a pouring nozzle formed on an outer surface of the top plate section so as to surround an opening-scheduled portion, and can be fitted and fixed to a container mouth; and a top lid composed of a top face, and a circumferential wall suspending from an outer peripheral edge of the top face, wherein the top lid has, formed therein, a protrusion protruding downward from an inner surface of the top face and having an engaging portion on an outer surface thereof; and the cap body has an inner plug formed therein, the inner plug is composed of an annular sidewall having an outer diameter enabling the annular sidewall to intimately contact an inner surface of the pouring nozzle, and a bottom formed at a lower part of the annular sidewall, the inner plug is formed integrally with the cap body via a breakable weakened portion at a position below a seal portion of the pouring nozzle having an inner diameter enabling the seal portion to intimately contact the inner plug, an engaged portion vertically engageable with the engaging portion of the protrusion is formed on an inner surface of the annular sidewall, and the top lid is hingedly coupled to the cap body.

8. The plastic cap according to claim 7, wherein
the inner plug is formed, via the breakable weakened portion, starting at an edge of the opening-scheduled portion of the top plate section.

9. The plastic cap according to claim 7, wherein, with the top lid being fixed to the cap body, the breakable weakened portion is broken, the engaged portion of the inner plug released from the cap body climbs over the engaging portion of the protrusion, whereupon the engaged portion and the engaging portion become engageable with each other, and an outer surface of the annular sidewall and the inner surface of the pouring nozzle make intimate contact.

10. The plastic cap according to claim 9, wherein
in a closed state of the top lid fixed to the cap body, the engaging portion of the protrusion and the engaged portion of the inner plug have a clearance therebetween in an axial direction.

11. The plastic cap according to claim 7, wherein
an outer diameter of a guide portion is smaller than an inner diameter of a recess of the protrusion, and
an axial length of the guide portion is smaller than a depth of the recess of the protrusion.

12. The plastic cap according to claim 11, wherein
with the top lid being fixed to the cap body, an upper end of the guide portion is located axially upwardly of the engaging portion of the protrusion, and is located axially downwardly of the engaged portion of the inner plug.

13. A method for manufacturing a plastic cap that includes:

a cap body which is composed of a top plate section and a skirt section, has a pouring nozzle formed on an outer surface of the top plate section so as to surround an opening-scheduled portion, and can be fitted and fixed to a container mouth; and a top lid composed of a top face, and a circumferential wall suspending from an outer peripheral edge of the top face, wherein the top lid has, formed therein, a protrusion protruding downward from an inner surface of the top face and having an engaging portion on an outer surface thereof; and the cap body has an inner plug formed therein, the inner plug is composed of an annular sidewall having an outer diameter enabling the annular sidewall to intimately contact an inner surface of the pouring nozzle, and a bottom formed at a lower part of the annular sidewall, the inner plug is formed integrally with the cap body via a breakable weakened portion at a position below a seal portion of the pouring nozzle having an inner diameter enabling the seal portion to intimately contact the inner plug, and an engaged portion vertically engageable with the engaging portion of the protrusion is formed on an inner surface of the annular sidewall, the method comprising:

molding the cap body and the top lid; and then with the top lid being fixed to the cap body, pressing the bottom of the inner plug from below to break the breakable weakened portion, render the engaging portion of the protrusion and the engaged portion of the inner plug engageable with each other, and bring the outer surface of the annular sidewall and the inner surface of the pouring nozzle into intimate contact.

14. The method for manufacturing the plastic cap according to claim 13, wherein
the cap body and the top lid are hingedly coupled together, and
after the cap body and the top lid are molded in an opened state, the top lid is fixed to the cap body.

\* \* \* \* \*